US012234909B2

(12) United States Patent
Zhu et al.

(10) Patent No.: US 12,234,909 B2
(45) Date of Patent: Feb. 25, 2025

(54) HYDRO-MECHANICAL SERIES AND PARALLEL TRANSMISSION DEVICE AND CONTROL METHOD THEREOF

(71) Applicant: JIANGSU UNIVERSITY, Zhenjiang (CN)

(72) Inventors: Zhen Zhu, Zhenjiang (CN); Yihan Zhang, Zhenjiang (CN); Yingfeng Cai, Zhenjiang (CN); Long Chen, Zhenjiang (CN); Changgao Xia, Zhenjiang (CN); Xiaodong Sun, Zhenjiang (CN); Xiang Tian, Zhenjiang (CN); Rui Hou, Zhenjiang (CN); Jie Sheng, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/276,264

(22) PCT Filed: Feb. 23, 2022

(86) PCT No.: PCT/CN2022/077357
§ 371 (c)(1),
(2) Date: Aug. 2, 2024

(87) PCT Pub. No.: WO2023/155216
PCT Pub. Date: Aug. 24, 2023

(65) Prior Publication Data
US 2025/0020206 A1 Jan. 16, 2025

(30) Foreign Application Priority Data
Feb. 17, 2022 (CN) .......................... 202210147942.7

(51) Int. Cl.
*F16H 47/04* (2006.01)
*F16H 61/70* (2006.01)
*F16H 61/00* (2006.01)

(52) U.S. Cl.
CPC ............. *F16H 61/70* (2013.01); *F16H 47/04* (2013.01); *F16H 2061/009* (2013.01); *F16H 2200/0039* (2013.01); *F16H 2200/2005* (2013.01)

(58) Field of Classification Search
CPC .................... F16H 47/04; F16H 2200/0039
(Continued)

(56) References Cited

U.S. PATENT DOCUMENTS 6,190,280 B1 * 2/2001 Horsch ................. F16H 37/042
475/209
9,261,180 B2 * 2/2016 Rintoo .................... F16H 47/04

FOREIGN PATENT DOCUMENTS

AT          503365 B1 *  1/2015  ............. F16H 47/04
CN       104121346 A     10/2014
(Continued)

*Primary Examiner* — Sherry L Estremsky
(74) *Attorney, Agent, or Firm* — Bayramoglu Law Offices LLC

(57) ABSTRACT

A hydro-mechanical series and parallel transmission device and a control method thereof are provided. The device includes an input shaft assembly, a hydraulic transmission assembly, a planetary gear transmission assembly, an intermediate gear transmission assembly, and an output shaft assembly. Switching among a hydraulic transmission mode, a mechanical transmission mode, and a hydro-mechanical composite transmission mode is implemented through combination and engagement/disengagement of clutches and brakes. The hydro-mechanical series transmission is used to expand the speed regulation range of the hydraulic transmission and is combined with the hydraulic transmission to meet the requirements on precision and the speed regulation (Continued)

range. The requirements of low-power and high-power operations are met through combination of the hydro-mechanical series and parallel transmissions. Multiple transmission modes are formed to adapt to the working conditions of startup, operation, and transfer.

9 Claims, 8 Drawing Sheets

(58) Field of Classification Search
USPC .......................................... 475/73, 78, 80, 83
See application file for complete search history.

(56) References Cited

FOREIGN PATENT DOCUMENTS

| | | | |
|---|---|---|---|
| CN | 107269796 A | | 10/2017 |
| CN | 107869563 A | * | 4/2018 |
| CN | 109578544 A | | 4/2019 |
| CN | 113147378 A | | 7/2021 |
| CN | 213744786 U | | 7/2021 |
| DE | 3925732 C1 | * | 1/1991 |
| GB | 1181526 A | | 2/1970 |
| WO | 2014095317 A1 | | 6/2014 |

* cited by examiner

HYDRO-MECHANICAL SERIES AND PARALLEL TRANSMISSION DEVICE AND CONTROL METHOD THEREOF

CROSS REFERENCE TO THE RELATED APPLICATIONS

This application is the national phase entry of International Application No. PCT/CN2022/077357, filed on Feb. 23, 2022, which is based upon and claims priority to Chinese Patent Application No. 202210147942.7, filed on Feb. 17, 2022, the entire contents of which are incorporated herein by reference.

TECHNICAL FIELD

The present disclosure relates to a transmission device and a control method thereof, and in particular, to a hydro-mechanical series and parallel transmission device and a control method thereof, which belong to the technical field of variable transmission devices.

BACKGROUND

The hydraulic transmission features low speed and high torque, but its transmission efficiency is not high. The mechanical transmission has high transmission efficiency, but it is difficult to achieve stepless speed variation. The combination of the hydraulic transmission and the mechanical transmission can carry forward the advantages and abandon the disadvantages of the two. The technology of connecting the hydraulic transmission mechanism and the mechanical transmission mechanism in series is mature, which expands the speed regulation range of the hydraulic transmission mechanism of the same type, but the overall efficiency is not high. The technology of connecting the hydraulic transmission mechanism and the mechanical transmission mechanism in parallel is difficult to control, but it features efficient stepless speed regulation. The hydro-mechanical series mode can well adapt to the requirements of some low-power operations, thus avoiding the situation of "a big horse tugging a small cart". In the case of some high-power operations, the hydro-mechanical parallel mode provides the desired power and realizes stepless speed variation. It is of practical significance to design a variable transmission device that integrates hydraulic transmission, mechanical transmission, and hydro-mechanical transmission to adapt to various working conditions, where the hydro-mechanical transmission includes hydro-mechanical series transmission and hydro-mechanical parallel transmission to meet different power requirements, thereby ensuring the power performance and fuel economy of the system.

SUMMARY

To eliminate the defects in the prior art, the present disclosure provides a hydro-mechanical series and parallel transmission device and a control method thereof. The present disclosure implements a variable transmission mode that integrates hydraulic transmission, mechanical transmission, and hydro-mechanical composite transmission to adapt to various working conditions, where the hydro-mechanical composite transmission includes hydro-mechanical series transmission and hydro-mechanical parallel transmission to meet different power requirements, thereby ensuring the power performance and fuel economy of the system.

A hydro-mechanical series and parallel transmission device is provided, which includes an input shaft assembly, where the input shaft assembly includes an input shaft, a first clutch $C_1$, a linked intermediate gear set, and a fifth clutch $C_5$;

a hydraulic transmission assembly, where the hydraulic transmission assembly includes a variable displacement pump, a fixed displacement motor, and a second clutch $C_2$, and the variable displacement pump is connected to the input shaft through the second clutch $C_2$;

a planetary gear transmission assembly, where the planetary gear transmission assembly includes an outer ring gear, a planet carrier, a sun gear, and a sixth clutch $C_6$, the sixth clutch $C_6$ is connected to the sun gear, and the fifth clutch $C_5$ is connected to the outer ring gear;

an intermediate gear transmission assembly, where the intermediate gear transmission assembly includes a first transmission gear, a second transmission gear, a third transmission gear, a fourth transmission gear, a third clutch $C_3$, a fourth clutch $C_4$, and a brake $B_1$, the first transmission gear is fixedly connected to an output shaft of the fixed displacement motor, the first transmission gear meshes with the second transmission gear, the second transmission gear is connected to the third transmission gear through the fourth clutch $C_4$, the third transmission gear meshes with the fourth transmission gear, the fourth transmission gear is connected to the sun gear and the brake $B_1$, the output shaft of the fixed displacement motor is connected to the linked intermediate gear set through the third clutch $C_3$ and the fifth clutch $C_5$, and the output shaft of the fixed displacement motor is connected to the sun gear through the third clutch $C_3$ and the sixth clutch $C_6$;

an output shaft assembly, where the output shaft assembly includes an output shaft and an intermediate gear, and the output shaft is connected to the planet carrier through the intermediate gear.

A control method of the hydro-mechanical series and parallel transmission device is provided to implement switching among a hydraulic transmission mode, a mechanical transmission mode, and a hydro-mechanical composite transmission mode through combination and engagement/disengagement of the clutches and the brakes.

Preferably, the hydro-mechanical composite transmission mode includes a hydro-mechanical series transmission mode and a hydro-mechanical parallel transmission mode.

Preferably, the hydraulic transmission mode is controlled by the following method:

engaging the second clutch $C_2$, the third clutch $C_3$, and the sixth clutch $C_6$ while disengaging the first clutch $C_1$, the fourth clutch $C_4$, the fifth clutch $C_5$, and the brake $B_1$, so that power is input from the input shaft and then passes through the second clutch $C_2$ to drive the variable displacement pump to work, the variable displacement pump outputs high-pressure oil to drive the fixed displacement motor to rotate, and the power output from the output shaft of the fixed displacement motor sequentially passes through the third clutch $C_3$, the sixth clutch $C_6$, the sun gear, the planet carrier, and the intermediate gear and is output from the output shaft.

a rotation speed $n_o$ of the output shaft in the hydraulic transmission mode is calculated by the following method:

$$n_o = \frac{e}{i_5 i_6} n_I$$

where $n_o$ is the rotation speed of the output shaft, $n_I$ is a rotation speed of the input shaft, is is a transmission ratio of the outer ring gear and the intermediate gear, $i_6$ is a transmission ratio of the intermediate gear and the output shaft, and e is a displacement ratio of the hydraulic transmission assembly.

Preferably, the mechanical transmission mode includes a first mechanical transmission gear, a second mechanical transmission gear, and a third mechanical transmission gear and is specifically controlled by the following methods:

in the first mechanical transmission gear, engaging the first clutch $C_1$, the fifth clutch $C_5$, and the brake $B_1$ while disengaging the second clutch $C_2$, the third clutch $C_3$, the fourth clutch $C_4$, and the sixth clutch $C_6$, so that power is input from the input shaft, then sequentially passes through the first clutch $C_1$, the linked intermediate gear set, the fifth clutch $C_5$, the outer ring gear, the planet carrier, and the intermediate gear, and is output from the output shaft;

in the second mechanical transmission gear, engaging the first clutch $C_1$, the fifth clutch $C_5$, and the sixth clutch $C_6$ while disengaging the second clutch $C_2$, the third clutch $C_3$, the fourth clutch $C_4$, and the brake $B_1$, so that power is input from the input shaft, then sequentially passes through the first clutch $C_1$, the linked intermediate gear set, the fifth clutch $C_5$, the sixth clutch $C_6$, the sun gear, the planet carrier, and the intermediate gear, and is output from the output shaft;

in the third mechanical transmission gear, engaging the first clutch $C_1$, the third clutch $C_3$, the fourth clutch $C_4$, and the fifth clutch $C_5$ while disengaging the second clutch $C_2$, the sixth clutch $C_6$, and the brake $B_1$, so that power is input from the input shaft, then sequentially passes through the first clutch $C_1$ and the linked intermediate gear set to the fifth clutch $C_5$, and is split into two parts: one part of the power passes through the third clutch $C_3$, the first transmission gear, the second transmission gear, the fourth clutch $C_4$, the third transmission gear, the fourth transmission gear, and the sun gear to the planet carrier; the other part of the power passes through the outer ring gear and is converged with the power from the intermediate gear transmission assembly at the planet carrier; the power after convergence passes through the planet carrier and the intermediate gear and is output from the output shaft.

The rotation speed $n_o$ of the output shaft in the first mechanical transmission gear, the second mechanical transmission gear, and the third mechanical transmission gear is calculated by the following methods:

in the first mechanical transmission gear, $$n_o = \frac{k}{(k+1)i_1 i_2 i_5 i_6} n_I$$

where $n_o$ is the rotation speed of the output shaft, $n_I$ is the rotation speed of the input shaft, $i_1$ is a transmission ratio of the first clutch $C_1$ and the linked intermediate gear set, $i_2$ is a transmission ratio of the linked intermediate gear set and the fifth clutch $C_5$, $i_5$ is the transmission ratio of the outer ring gear and the intermediate gear, $i_6$ is the transmission ratio of the intermediate gear and the output shaft, and k is a characteristic parameter of the gear set in the planetary gear transmission assembly;

in the second mechanical transmission gear, $$n_o = \frac{1}{i_1 i_2 i_5 i_6} n_I$$

where $n_o$ is the rotation speed of the output shaft, $n_I$ is the rotation speed of the input shaft, $i_1$ is the transmission ratio of the first clutch $C_1$ and the linked intermediate gear set, $i_2$ is the transmission ratio of the linked intermediate gear set and the fifth clutch $C_5$, $i_5$ is the transmission ratio of the outer ring gear and the intermediate gear, and $i_6$ is the transmission ratio of the intermediate gear and the output shaft;

in the third mechanical transmission gear, $$n_o = \frac{\frac{1}{i_1 i_2 i_3 i_4} + k\frac{1}{i_1 i_2}}{(k+1)i_5 i_6} n_I$$

where $n_o$ is the rotation speed of the output shaft, $n_I$ is the rotation speed of the input shaft, $i_1$ is the transmission ratio of the first clutch $C_1$ and the linked intermediate gear set, $i_2$ is the transmission ratio of the linked intermediate gear set and the fifth clutch $C_5$, $i_3$ is a transmission ratio of the first transmission gear and the second transmission gear, $i_5$ is a transmission ratio of the third transmission gear and the fourth transmission gear, $i_5$ is the transmission ratio of the outer ring gear and the intermediate gear, $i_6$ is the transmission ratio of the intermediate gear and the output shaft, and k is the characteristic parameter of the gear set in the planetary gear transmission assembly.

Preferably, the hydro-mechanical series transmission mode and the hydro-mechanical parallel transmission mode are controlled by the following methods:

in the hydro-mechanical series transmission mode, engaging the second clutch $C_2$, the fourth clutch $C_4$, and the sixth clutch $C_6$ while disengaging the first clutch $C_1$, the third clutch $C_3$, the fifth clutch $C_5$, and the brake $B_1$, so that power is input from the input shaft and then passes through the second clutch $C_2$ to drive the variable displacement pump to work; the variable displacement pump outputs high-pressure oil to drive the fixed displacement motor to rotate; the power output from the output shaft of the fixed displacement motor sequentially passes through the first transmission gear, the second transmission gear, the fourth clutch $C_4$, the third transmission gear, the fourth transmission gear, the sun gear, the planet carrier, and the intermediate gear and is output from the output shaft;

in the hydro-mechanical parallel transmission mode, engaging the first clutch $C_1$, the second clutch $C_2$, the fourth clutch $C_4$, and the fifth clutch $C_5$ while disengaging the third clutch $C_3$, the sixth clutch $C_6$, and the brake $B_1$, so that power enters the input shaft assembly and is split into two parts: one part of the power is input from the input shaft and then passes through the second clutch $C_2$ to drive the variable displacement pump to work; the variable displacement pump outputs high-pressure oil to drive the fixed displacement motor to rotate; the power output from the output shaft of the fixed displacement motor sequentially passes through the first transmission gear, the second transmission gear, the fourth clutch $C_4$, the third transmission gear, the fourth transmission gear, and the sun gear to the planet carrier; the other part of the power sequentially passes through the first clutch $C_1$, the linked intermediate gear set, the fifth clutch $C_5$, and the outer ring gear and is converged with the power passing through the hydraulic transmission assembly and the intermediate gear transmission assembly at the planet carrier; the power after convergence passes through the planet carrier and the intermediate gear and is output from the output shaft.

The rotation speed $n_o$ of the output shaft in the hydro-mechanical series transmission mode and the hydro-mechanical parallel transmission mode is calculated by the following methods: in the hydro-mechanical series transmission mode, $$n_o = \frac{e}{i_3 i_4 i_5 i_6} n_I$$

where $n_o$ is the rotation speed of the output shaft, $n_I$ is the rotation speed of the input shaft, $i_3$ is the transmission ratio of the first transmission gear and the second transmission gear, $i_4$ is the transmission ratio of the third transmission gear and the fourth transmission gear, $i_5$ is the transmission ratio of the outer ring gear and the intermediate gear, and $i_6$ is the transmission ratio of the intermediate gear and the output shaft;

in the hydro-mechanical parallel transmission mode, $$n_o = \frac{\frac{e}{i_3 i_4} + k \frac{1}{i_1 i_2}}{(k+1) i_5 i_6} n_I$$

where $n_o$ is the rotation speed of the output shaft, $n_I$ is the rotation speed of the input shaft, $i_1$ is the transmission ratio of the first clutch $C_1$ and the linked intermediate gear set, $i_2$ is the transmission ratio of the linked intermediate gear set and the fifth clutch $C_5$, $i_3$ is the transmission ratio of the first transmission gear and the second transmission gear, $i_4$ is the transmission ratio of the third transmission gear and the fourth transmission gear, $i_5$ is the transmission ratio of the outer ring gear and the intermediate gear, $i_6$ is the transmission ratio of the intermediate gear and the output shaft, k is the characteristic parameter of the gear set in the planetary gear transmission assembly, and e is the displacement ratio of the hydraulic transmission assembly.

Beneficial effects: The hydro-mechanical series transmission is used to expand the speed regulation range of the hydraulic transmission and is combined with the hydraulic transmission to meet the requirements on precision and the speed regulation range; the requirements of low-power and high-power operations are met through combination of the hydro-mechanical series and parallel transmissions; and multiple transmission modes are formed to adapt to the working conditions of startup, operation, and transfer.

BRIEF DESCRIPTION OF THE DRAWINGS

To illustrate the technical solutions in the embodiments of the present disclosure or in the prior art more clearly, the accompanying drawings required for the description of the embodiments or the prior art are introduced briefly in the following. Apparently, the accompanying drawings in the following description show merely the embodiments of the present disclosure, and persons of ordinary skill in the art can derive other drawings from the accompanying drawings without creative efforts.

DETAILED DESCRIPTION OF THE EMBODIMENTS

The technical solutions of the present disclosure will be clearly and completely described below with reference to the accompanying drawings in the embodiments of the present disclosure. It is obvious that the embodiments to be described are only a part rather than all of the embodiments of the present disclosure. All other embodiments derived by persons of ordinary skill in the art based on the embodiments of the present disclosure without creative efforts shall fall within the protection scope of the present disclosure.

In the description of the present disclosure, it should be understood that terms such as "upper", "lower", "front", "back", "left", "right", "vertical", "horizontal", "top", "bottom", "inner", and "outer" indicate directional or positional relationships based on the accompanying drawings. They are merely used for the convenience and simplicity of the description of the present disclosure, instead of indicating or implying that the demonstrated device or element is located in a specific direction or is constructed and operated in a specific direction. Therefore, they cannot be construed as limitations to the present disclosure.

In the present disclosure, unless otherwise expressly specified and defined, a first feature "on" or "under" a second feature may denote that the first and second features are in direct contact or the first and second features are not in direct contact but through another feature between them. Moreover, the first feature "on", "over", or "above" the second feature denotes that the first feature is directly above or obliquely above the second feature or it simply means that the first feature is at a higher level than the second feature. The first feature "under", "beneath", or "below" the second feature denotes that the first feature is directly below or obliquely below the second feature or it simply means that the first feature is at a lower level than the second feature.

Figure 1:
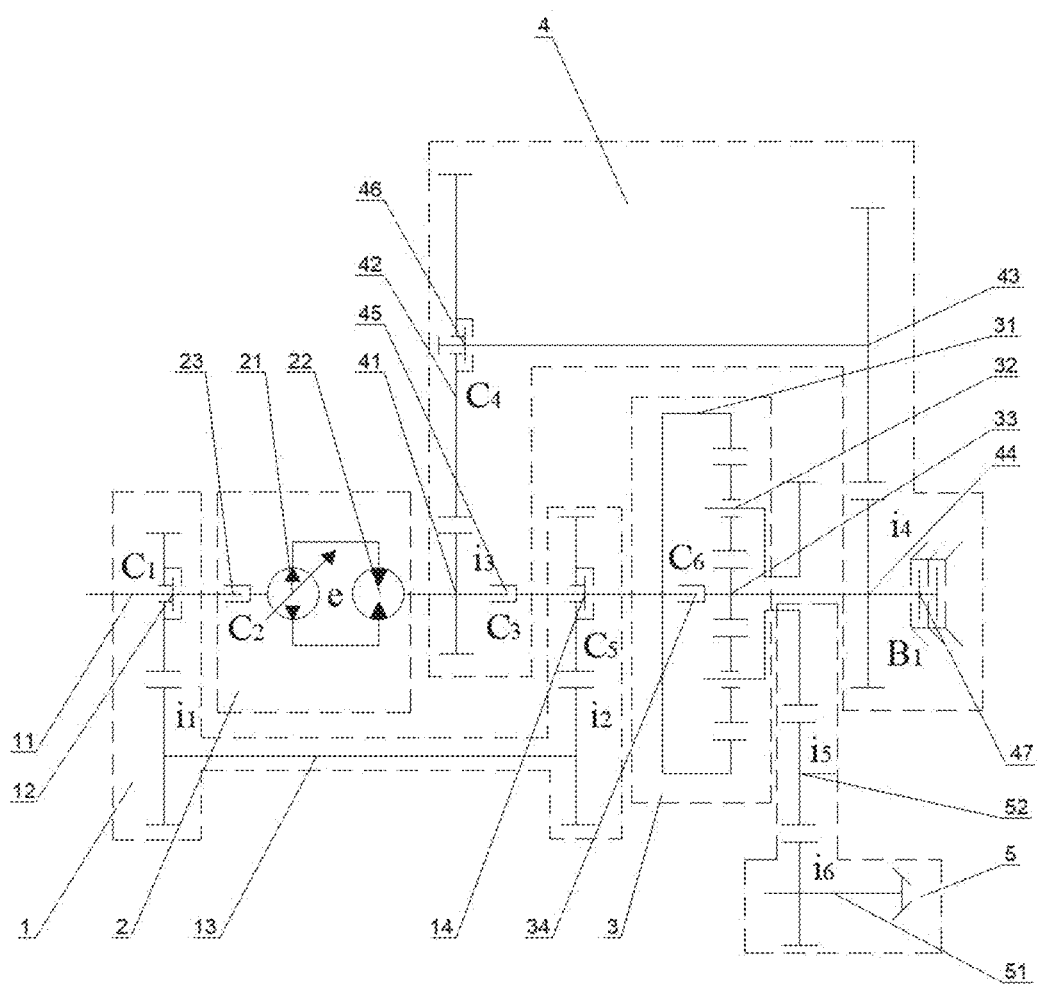
FIG. 1 is a schematic structural diagram of the present disclosure.

As shown in FIG. 1, a hydro-mechanical series and parallel transmission device includes an input shaft assembly 1, where the input shaft assembly 1 includes an input shaft 11, a first clutch $C_1$ 12, a linked intermediate gear set 13, and a fifth clutch $C_5$ 14;

a hydraulic transmission assembly 2, where the hydraulic transmission assembly 2 includes a variable displacement pump 21, a fixed displacement motor 22, and a second clutch $C_2$ 23, and the variable displacement pump 21 is connected to the input shaft 11 through the second clutch $C_2$ 23;

a planetary gear transmission assembly 3, where the planetary gear transmission assembly 3 includes an outer ring gear 31, a planet carrier 32, a sun gear 33, and a sixth clutch $C_6$ 34, the sixth clutch $C_6$ 34 is connected to the sun gear 33, and the fifth clutch $C_5$ 14 is connected to the outer ring gear 31;

an intermediate gear transmission assembly 4, where the intermediate gear transmission assembly 4 includes a first transmission gear 41, a second transmission gear 42, a third transmission gear 43, a fourth transmission gear 44, a third clutch $C_3$ 45, a fourth clutch $C_4$ 46, and a brake $B_1$ 47, the first transmission gear 41 is fixedly connected to an output shaft of the fixed displacement motor 22, the first transmission gear 41 meshes with the second transmission gear 42, the second transmission gear 42 is connected to the third transmission gear 43 through the fourth clutch $C_4$ 46, the third transmission gear 43 meshes with the fourth transmission gear 44, the fourth transmission gear 44 is connected to the sun gear 33 and the brake $B_1$ 47, the output shaft of the fixed displacement motor 22 is connected to the linked intermediate gear set 13 through the third clutch $C_4$ 45 and the fifth clutch $C_5$ 14, and the output shaft of the fixed displacement motor 22 is connected to the sun gear 33 through the third clutch $C_3$ 45 and the sixth clutch $C_6$ 34;

an output shaft assembly 5, where the output shaft assembly 5 includes an output shaft 51 and an intermediate gear 52, and the output shaft 51 is connected to the planet carrier 32 through the intermediate gear 52.

Referring to Table 1, a control method of the hydro-mechanical series and parallel transmission device is provided to implement switching among a hydraulic transmission mode, a mechanical transmission mode, and a hydro-mechanical composite transmission mode through combination and engagement/disengagement of the clutches and the brakes.

The hydro-mechanical composite transmission mode includes a hydro-mechanical series transmission mode and a hydro-mechanical parallel transmission mode.

TABLE 1

Engagement state of mode-switching components

| Transmission mode | Clutch state | | | | | | Brake state | Calculation formula |
|---|---|---|---|---|---|---|---|---|
| | $C_1$ | $C_2$ | $C_3$ | $C_4$ | $C_5$ | $C_6$ | $B_1$ | |
| Hydraulic transmission (H) | Δ | ▲ | ▲ | Δ | Δ | ▲ | Δ | $n_o = \dfrac{e}{i_5 i_6} n_I$ |
| First mechanical transmission gear (M1) | ▲ | Δ | Δ | Δ | ▲ | Δ | ▲ | $n_0 = \dfrac{k}{(k+1)i_1 i_2 i_5 i_6} n_I$ |
| Second mechanical transmission gear (M2) | ▲ | Δ | Δ | Δ | ▲ | ▲ | Δ | $n_0 = \dfrac{1}{i_1 i_2 i_5 i_6} n_I$ |
| Third mechanical transmission gear (M3) | ▲ | Δ | ▲ | ▲ | ▲ | Δ | Δ | $n_o = \dfrac{\dfrac{1}{i_1 i_2 i_3 i_4} + k\dfrac{1}{i_1 i_2}}{(k+1)i_5 i_6} n_I$ |
| Hydro-mechanical series transmission (HM1) | Δ | ▲ | Δ | ▲ | Δ | ▲ | Δ | $n_o = \dfrac{e}{i_3 i_4 i_5 i_6} n_I$ |
| Hydro-mechanical parallel transmission (HM2) | ▲ | ▲ | Δ | ▲ | ▲ | Δ | Δ | $n_o = \dfrac{\dfrac{e}{i_3 i_4} + k\dfrac{1}{i_1 i_2}}{(k+1)i_5 i_6} n_I$ |

Note: B stands for brake and C stands for clutch;
▲ indicates that the execution component is engaged and
Δ indicates that the execution component is disengaged.

Figure 2:
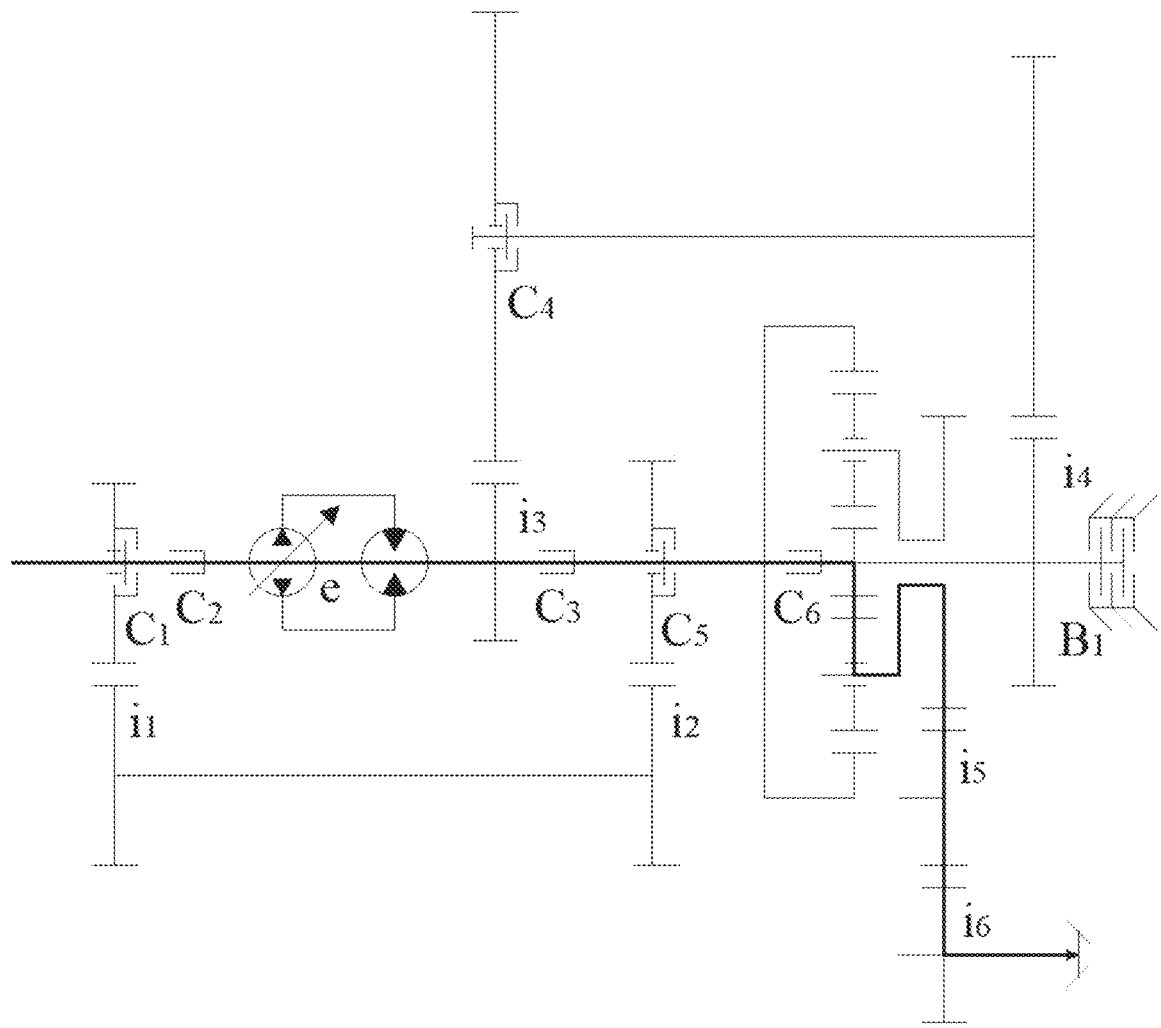
FIG. 2 is a schematic diagram showing the power flow in a hydraulic transmission mode according to the present disclosure.

As shown in FIG. 2, the hydraulic transmission mode is controlled by the following method: The second clutch $C_2$ 23, the third clutch $C_3$ 45, and the sixth clutch $C_6$ 34 are engaged while the first clutch $C_1$ 12, the fourth clutch $C_4$ 46, the fifth clutch $C_5$ 14, and the brake $B_1$ 47 are disengaged. Power is input from the input shaft 11 and then passes through the second clutch $C_2$ 23 to drive the variable displacement pump 21 to work. The variable displacement pump 21 outputs high-pressure oil to drive the fixed displacement motor 22 to rotate. The power output from the output shaft of the fixed displacement motor 22 sequentially passes through the third clutch $C_3$ 45, the sixth clutch $C_6$ 34, the sun gear 33, the planet carrier 32, and the intermediate gear 52 and is output from the output shaft 51.

The rotation speed $n_o$ of the output shaft 51 in the hydraulic transmission mode is calculated by the following method:

$$n_o = \dfrac{e}{i_5 i_6} n_I$$

where $n_o$ is the rotation speed of the output shaft 51, $n_I$ is the rotation speed of the input shaft 11, $i_5$ is a transmission ratio of the outer ring gear 31 and the intermediate gear 52, $i_6$ is a transmission ratio of the intermediate gear 52 and the output shaft 51, and e is a displacement ratio of the hydraulic transmission assembly 2.

Figure 3:
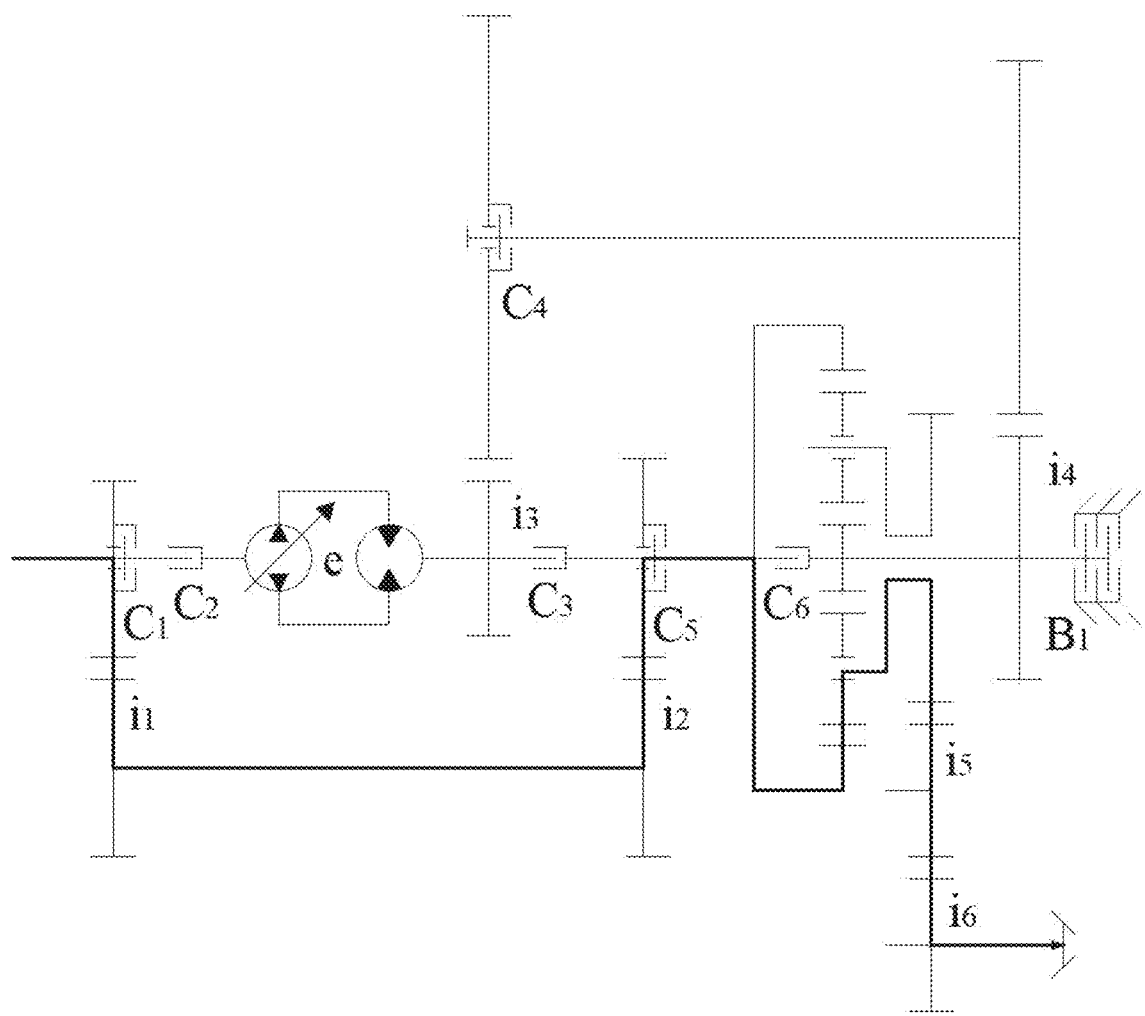
FIG. 3 is a schematic diagram showing the power flow in a first mechanical transmission gear according to the present disclosure.
Figure 4:
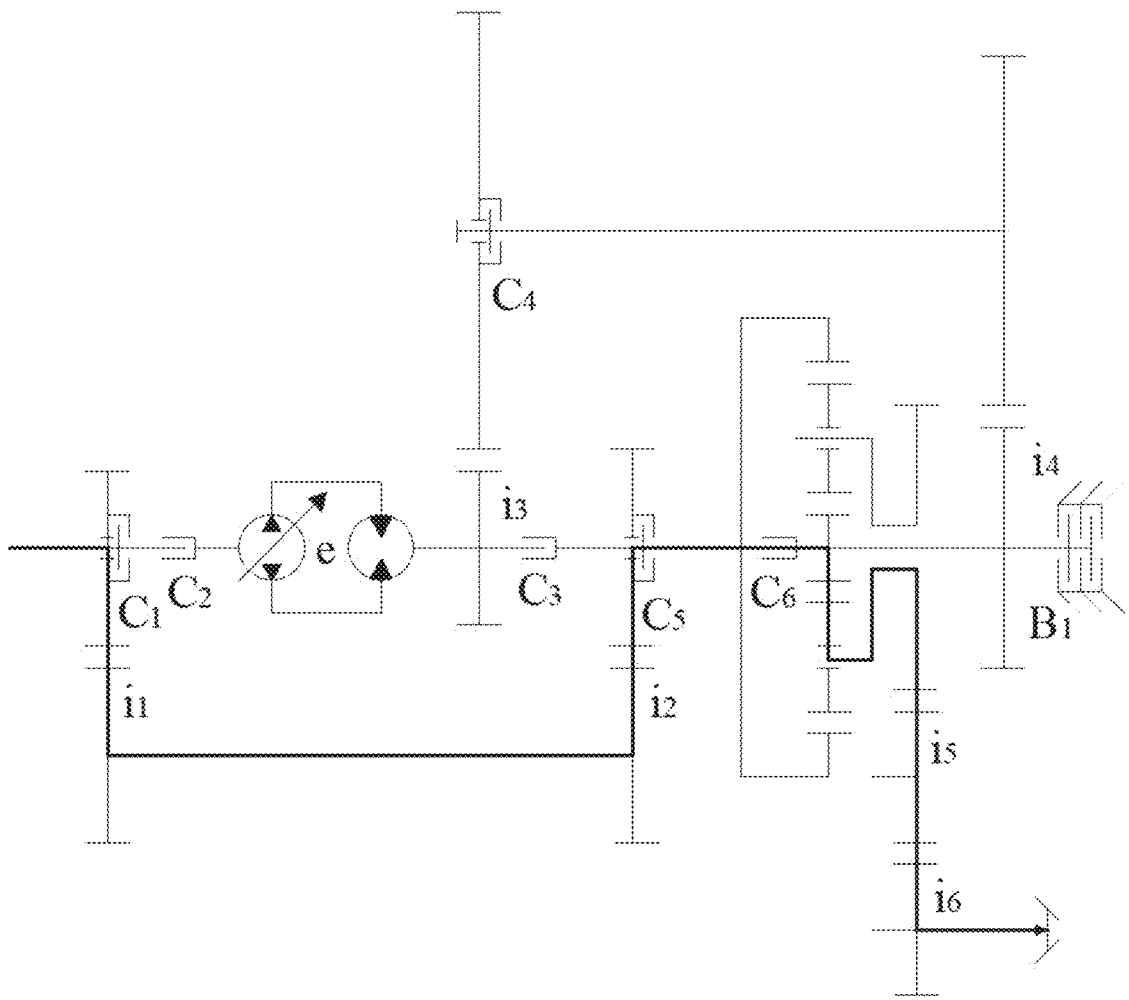
FIG. 4 is a schematic diagram showing the power flow in a second mechanical transmission gear according to the present disclosure.
Figure 5:
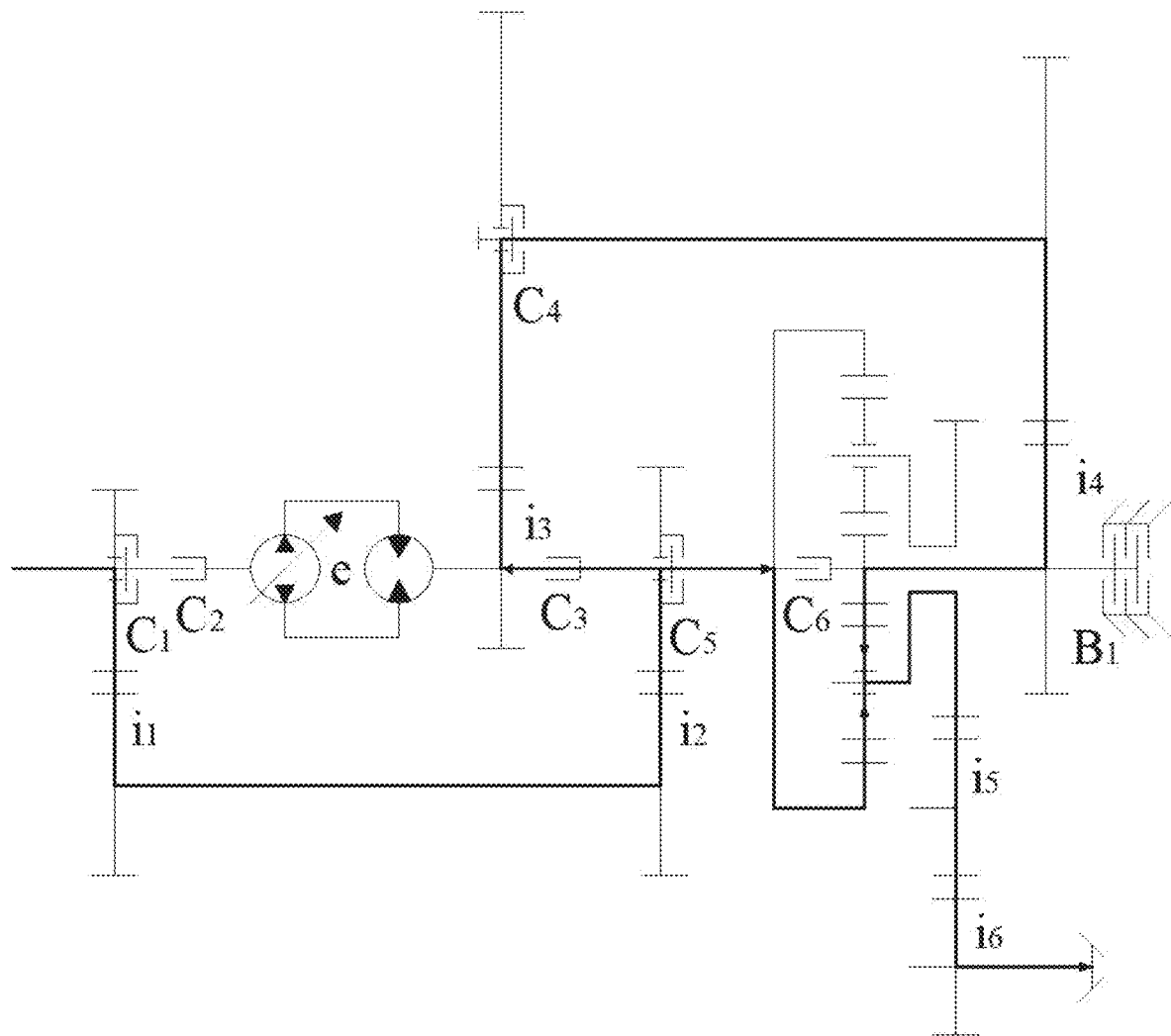
FIG. 5 is a schematic diagram showing the power flow in a third mechanical transmission gear according to the present disclosure.

As shown in FIG. 3, FIG. 4, and FIG. 5, the mechanical transmission mode includes a first mechanical transmission gear, a second mechanical transmission gear, and a third mechanical transmission gear. The specific control method and the calculation method of the rotation speed $n_o$ of the output shaft 51 in each mode are as follows:

As shown in FIG. 3, in the first mechanical transmission gear, the first clutch $C_1$ 12, the fifth clutch $C_5$ 14, and the brake $B_1$ 47 are engaged while the second clutch $C_2$ 23, the third clutch $C_3$ 45, the fourth clutch $C_4$ 46, and the sixth clutch C₆ 34 are disengaged. Power is input from the input shaft 11, then sequentially passes through the first clutch C₁ 12, the linked intermediate gear set 13, the fifth clutch C₅ 14, the outer ring gear 31, the planet carrier 32, and the intermediate gear 52, and is output from the output shaft 51.

$$n_o = \frac{k}{(k+1)i_1 i_2 i_5 i_6} n_I$$

where $n_o$ is the rotation speed of the output shaft 51, $n_I$ is the rotation speed of the input shaft 11, $i_1$ is a transmission ratio of the first clutch C₁ 12 and the linked intermediate gear set 13, $i_2$ is a transmission ratio of the linked intermediate gear set 13 and the fifth clutch C₅ 14, $i_5$ is the transmission ratio of the outer ring gear 31 and the intermediate gear 52, $i_6$ is the transmission ratio of the intermediate gear 52 and the output shaft 51, and k is a characteristic parameter of the gear set in the planetary gear transmission assembly 3.

As shown in FIG. 4, in the second mechanical transmission gear, the first clutch C₁ 12, the fifth clutch C₅ 14, and the sixth clutch C₆ 34 are engaged while the second clutch C₂ 23, the third clutch C₃ 45, the fourth clutch C₄ 46, and the brake B₁ 47 are disengaged. Power is input from the input shaft 11, then sequentially passes through the first clutch C₁ 12, the linked intermediate gear set 13, the fifth clutch C₅ 14, the sixth clutch C₆ 34, the sun gear 33, the planet carrier 32, and the intermediate gear 52, and is output from the output shaft 51.

$$n_o = \frac{1}{i_1 i_2 i_5 i_6} n_I$$

where $n_o$ is the rotation speed of the output shaft 51, $n_I$ is the rotation speed of the input shaft 11, it is the transmission ratio of the first clutch C₁ 12 and the linked intermediate gear set 13, $i_2$ is the transmission ratio of the linked intermediate gear set 13 and the fifth clutch C₅ 14, $i_5$ is the transmission ratio of the outer ring gear 31 and the intermediate gear 52, and $i_6$ is the transmission ratio of the intermediate gear 52 and the output shaft 51.

As shown in FIG. 5, in the third mechanical transmission gear, the first clutch C₁ 12, the third clutch C₃ 45, the fourth clutch C₄ 46, and the fifth clutch C₅ 14 are engaged while the second clutch C₂ 23, the sixth clutch C₆ 34, and the brake B₁ 47 are disengaged. Power is input from the input shaft 11, then sequentially passes through the first clutch C₁ 12 and the linked intermediate gear set 13 to the fifth clutch C₅ 14, and is split into two parts. One part of the power passes through the third clutch C₃ 45, the first transmission gear 41, the second transmission gear 42, the fourth clutch C₄ 46, the third transmission gear 43, the fourth transmission gear 44, and the sun gear 33 to the planet carrier 32. The other part of the power passes through the outer ring gear 31 and is converged with the power from the intermediate gear transmission assembly 4 at the planet carrier 32. The power after convergence passes through the planet carrier 32 and the intermediate gear 52 and is output from the output shaft 51.

$$n_o = \frac{\frac{1}{i_1 i_2 i_3 i_4} + k \frac{1}{i_1 i_2}}{(k+1)i_5 i_6} n_I$$

where $n_o$ is the rotation speed of the output shaft 51, $n_I$ is the rotation speed of the input shaft 11, $i_1$ is the transmission ratio of the first clutch C₁ 12 and the linked intermediate gear set 13, $i_2$ is the transmission ratio of the linked intermediate gear set 13 and the fifth clutch C₅ 14, 13 is a transmission ratio of the first transmission gear 41 and the second transmission gear 42, $i_4$ is a transmission ratio of the third transmission gear 43 and the fourth transmission gear 44, $i_5$ is the transmission ratio of the outer ring gear 31 and the intermediate gear 52, $i_6$ is the transmission ratio of the intermediate gear 52 and the output shaft 51, and k is the characteristic parameter of the gear set in the planetary gear transmission assembly 3.

Figure 6:
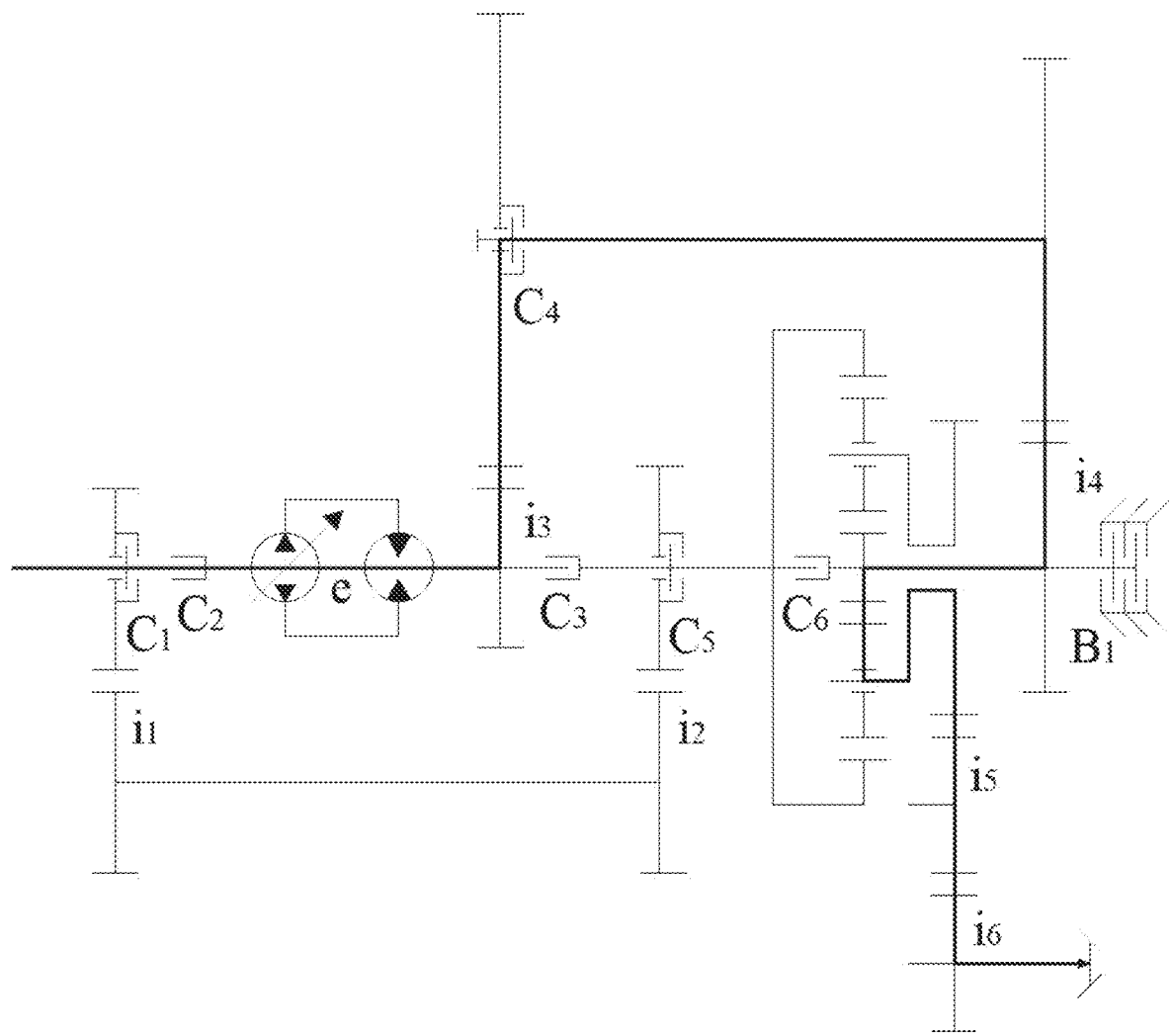
FIG. 6 is a schematic diagram showing the power flow in a hydro-mechanical series transmission mode according to the present disclosure.
Figure 7:
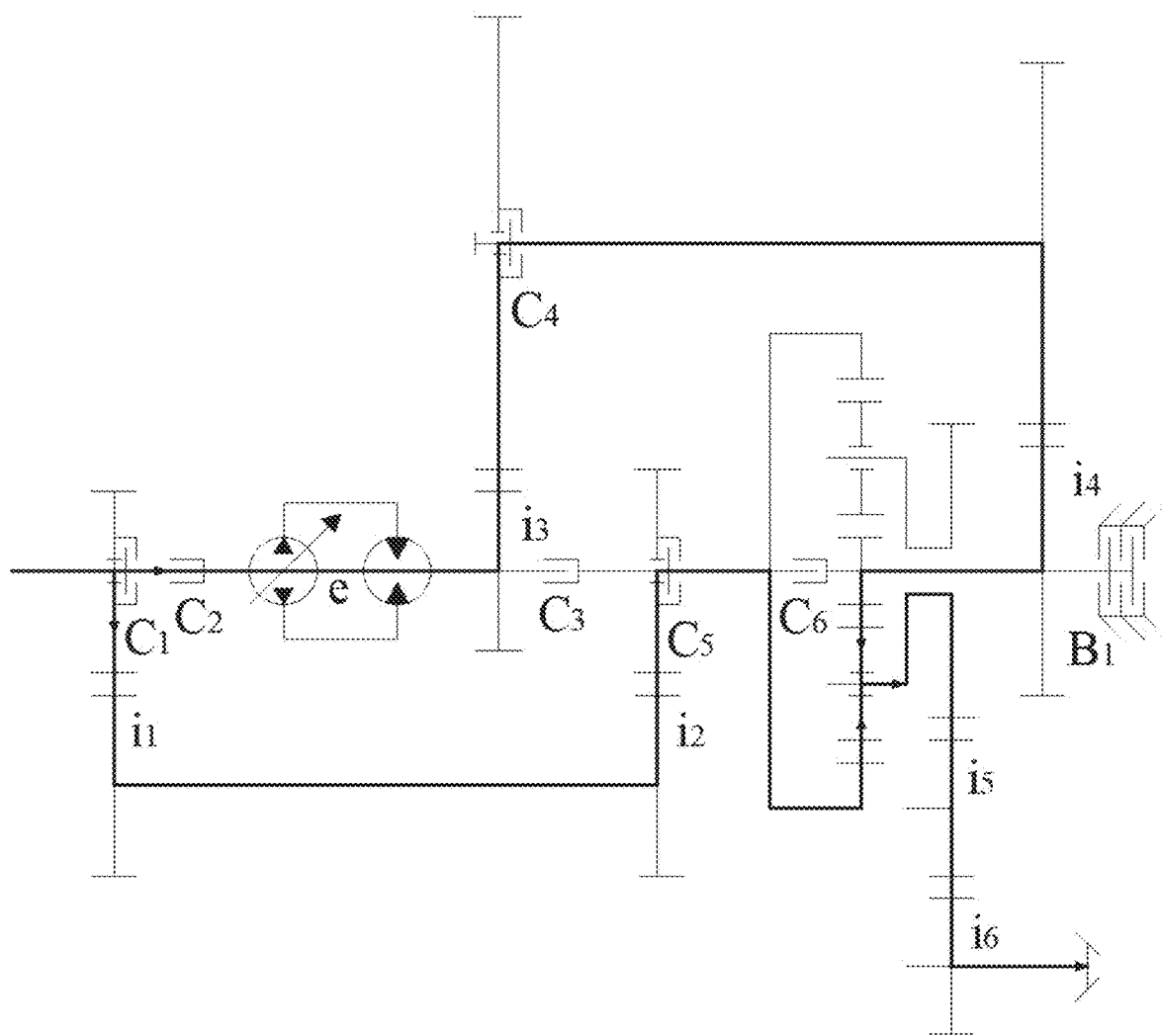
FIG. 7 is a schematic diagram showing the power flow in a hydro-mechanical parallel transmission mode according to the present disclosure.

As shown in FIG. 6 and FIG. 7, the control methods of the hydro-mechanical series transmission mode and the hydro-mechanical parallel transmission mode and the calculation methods of the rotation speed $n_o$ of the output shaft 51 are as follows:

As shown in FIG. 6, in the hydro-mechanical series transmission mode, the second clutch C₂ 23, the fourth clutch C₄ 46, and the sixth clutch C₆ 34 are engaged while the first clutch C₁ 12, the third clutch C₃ 45, the fifth clutch C₅ 14, and the brake B₁ 47 are disengaged. Power is input from the input shaft 11 and then passes through the second clutch C₂ 23 to drive the variable displacement pump 21 to work. The variable displacement pump 21 outputs high-pressure oil to drive the fixed displacement motor 22 to rotate. The power output from the output shaft of the fixed displacement motor 22 sequentially passes through the first transmission gear 41, the second transmission gear 42, the fourth clutch C₄ 46, the third transmission gear 43, the fourth transmission gear 44, the sun gear 33, the planet carrier 32, and the intermediate gear 52 and is output from the output shaft 51.

In the hydro-mechanical series transmission mode, $$n_o = \frac{e}{i_3 i_4 i_5 i_6} n_I$$

where $n_o$ is the rotation speed of the output shaft 51, $n_I$ is the rotation speed of the input shaft 11, $i_5$ is the transmission ratio of the first transmission gear 41 and the second transmission gear 42, $i_4$ is the transmission ratio of the third transmission gear 43 and the fourth transmission gear 44, $i_5$ is the transmission ratio of the outer ring gear 31 and the intermediate gear 52, and $i_6$ is the transmission ratio of the intermediate gear 52 and the output shaft 51.

As shown in FIG. 7, in the hydro-mechanical parallel transmission mode, the first clutch C₁ 12, the second clutch C₂ 23, the fourth clutch C₄ 46, and the fifth clutch C₅ 14 are engaged while the third clutch C₃ 45, the sixth clutch C₆ 34, and the brake B₁ 47 are disengaged. Power enters the input shaft assembly 1 and is split into two parts. One part of the power is input from the input shaft 11 and then passes through the second clutch C₂ 23 to drive the variable displacement pump 21 to work. The variable displacement pump 21 outputs high-pressure oil to drive the fixed displacement motor 22 to rotate. The power output from the output shaft of the fixed displacement motor 22 sequentially passes through the first transmission gear 41, the second transmission gear 42, the fourth clutch C₄ 46, the third transmission gear 43, the fourth transmission gear 44, and the sun gear 33 to the planet carrier 32. The other part of the power sequentially passes through the first clutch C₁ 12, the linked intermediate gear set 13, the fifth clutch C₅ 14, and the outer ring gear 31 and is converged with the power passing through the hydraulic transmission assembly 2 and the intermediate gear transmission assembly 4 at the planet carrier 32. The power after convergence passes through the planet carrier 32 and the intermediate gear 52 and is output from the output shaft 51.

In the hydro-mechanical parallel transmission mode, $$n_o = \frac{\frac{e}{i_3 i_4} + k \frac{1}{i_1 i_2}}{(k+1) i_5 i_6} n_I$$

where $n_o$ is the rotation speed of the output shaft 51, $n_I$ is the rotation speed of the input shaft 11, $i_1$ is the transmission ratio of the first clutch $C_1$ 12 and the linked intermediate gear set 13, $i_2$ is the transmission ratio of the linked intermediate gear set 13 and the fifth clutch $C_5$ 14, $i_3$ is the transmission ratio of the first transmission gear 41 and the second transmission gear 42, $i_4$ is the transmission ratio of the third transmission gear 43 and the fourth transmission gear 44, $i_5$ is the transmission ratio of the outer ring gear 31 and the intermediate gear 52, $i_6$ is the transmission ratio of the intermediate gear 52 and the output shaft 51, k is the characteristic parameter of the gear set in the planetary gear transmission assembly 3, and e is the displacement ratio of the hydraulic transmission assembly 2.

Figure 8:
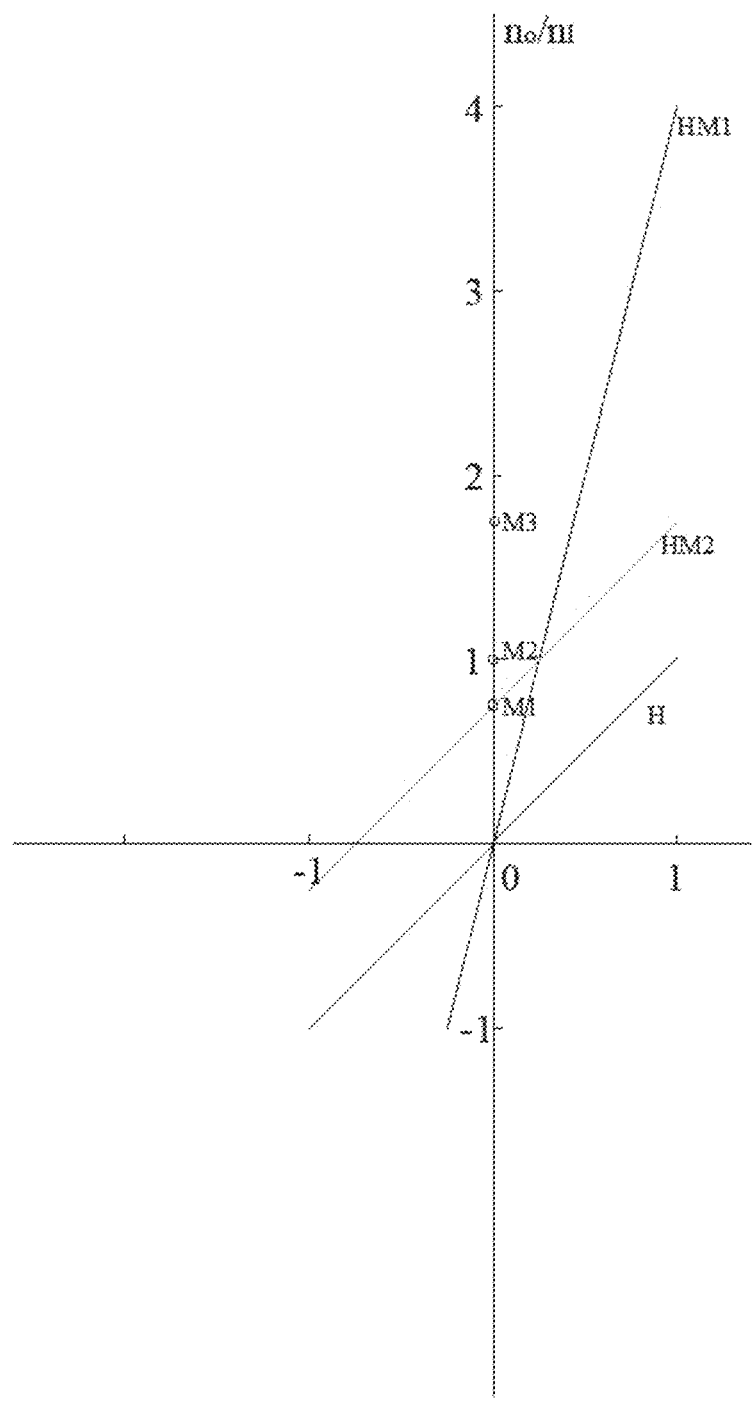
FIG. 8 shows a speed regulation characteristic curve of the present disclosure.

As shown in FIG. 8, the characteristic parameters of each gear pair and the planetary gear transmission assembly are set to obtain a speed regulation characteristic curve, where
if $i_1 i_2=1.0$, $i_3 i_4=0.25$, $i_5 i_6=1.0$, and k=3,
in the hydraulic transmission mode, $n_o=en_I$;
in the hydro-mechanical series transmission mode, $n_o=4en_I$;
in the hydro-mechanical parallel transmission mode, $$n_o = \frac{4e+3}{4} n_I;$$

in the first mechanical transmission gear, $$n_o = \frac{3}{4} n_I;$$

in the second mechanical transmission gear, $n_o=n_I$; and
in the third mechanical transmission gear, $$n_o = \frac{7}{4} N_I.$$

All the embodiments in the specification are described in a progressive manner, each embodiment focuses on the differences from the other embodiments, and reference can be made to each other for the same or similar parts of the embodiments. Since the device disclosed herein corresponds to the method disclosed in the embodiments, the device is described simply and reference can be made to the description about the method for the related parts.

Persons skilled in the art can implement or use the present disclosure according to the description of the disclosed embodiments. It is apparent to persons skilled in the art that various modifications can be made to these embodiments, and general principles defined in this specification can be implemented in other embodiments without departing from the spirit or scope of the present disclosure. Therefore, the present disclosure is not limited by the embodiments described herein, but has the broadest scope conforming to the principles and innovative features disclosed by this specification.

What is claimed is:

1. A hydro-mechanical series and parallel transmission device, characterized by comprising:
    an input shaft assembly (1), wherein the input shaft assembly (1) comprises an input shaft (11), a first clutch $C_1$ (12), a linked intermediate gear set (13), and a fifth clutch $C_5$ (14);
    a hydraulic transmission assembly (2), wherein the hydraulic transmission assembly (2) comprises a variable displacement pump (21), a fixed displacement motor (22), and a second clutch $C_2$ (23), and the variable displacement pump (21) is connected to the input shaft (11) through the second clutch $C_2$ (23);
    a planetary gear transmission assembly (3), wherein the planetary gear transmission assembly (3) comprises an outer ring gear (31), a planet carrier (32), a sun gear (33), and a sixth clutch $C_6$ (34), the sixth clutch $C_6$ (34) is connected to the sun gear (33), and the fifth clutch $C_5$ (14) is connected to the outer ring gear (31);
    an intermediate gear transmission assembly (4), wherein the intermediate gear transmission assembly (4) comprises a first transmission gear (41), a second transmission gear (42), a third transmission gear (43), a fourth transmission gear (44), a third clutch $C_3$ (45), a fourth clutch $C_4$ (46), and a brake $B_1$ (47), the first transmission gear (41) is fixedly connected to an output shaft of the fixed displacement motor (22), the first transmission gear (41) meshes with the second transmission gear (42), the second transmission gear (42) is connected to the third transmission gear (43) through the fourth clutch $C_4$ (46), the third transmission gear (43) meshes with the fourth transmission gear (44), the fourth transmission gear (44) is connected to the sun gear (33) and the brake $B_1$ (47), the output shaft of the fixed displacement motor (22) is connected to the linked intermediate gear set (13) through the third clutch $C_3$ (45) and the fifth clutch $C_5$ (14), and the output shaft of the fixed displacement motor (22) is connected to the sun gear (33) through the third clutch $C_4$ (45) and the sixth clutch $C_6$ (34);
    an output shaft assembly (5), wherein the output shaft assembly (5) comprises an output shaft (51) and an intermediate gear (52), and the output shaft (51) is connected to the planet carrier (32) through the intermediate gear (52).

2. A control method of the hydro-mechanical series and parallel transmission device according to claim 1, characterized in that switching among a hydraulic transmission mode, a mechanical transmission mode, and a hydro-mechanical composite transmission mode is implemented through combination and engagement/disengagement of the clutches and the brakes.

3. The control method of the hydro-mechanical series and parallel transmission device according to claim 2, characterized in that the hydro-mechanical composite transmission mode comprises a hydro-mechanical series transmission mode and a hydro-mechanical parallel transmission mode.

4. The control method of the hydro-mechanical series and parallel transmission device according to claim 3, characterized in that the hydro-mechanical series transmission mode and the hydro-mechanical parallel transmission mode are controlled by the following methods:

in the hydro-mechanical series transmission mode, engaging the second clutch C₂ (23), the fourth clutch C₄ (46), and the sixth clutch C₆ (34) while disengaging the first clutch C₁ (12), the third clutch C₃ (45), the fifth clutch C₅ (14), and the brake B₁ (47), so that power is input from the input shaft (11) and then passes through the second clutch C₂ (23) to drive the variable displacement pump (21) to work; the variable displacement pump (21) outputs high-pressure oil to drive the fixed displacement motor (22) to rotate; the power output from the output shaft of the fixed displacement motor (22) sequentially passes through the first transmission gear (41), the second transmission gear (42), the fourth clutch C₄ (46), the third transmission gear (43), the fourth transmission gear (44), the sun gear (33), the planet carrier (32), and the intermediate gear (52) and is output from the output shaft (51);

in the hydro-mechanical parallel transmission mode, engaging the first clutch C₁ (12), the second clutch C₂ (23), the fourth clutch C₄ (46), and the fifth clutch C₅ (14) while disengaging the third clutch C₃ (45), the sixth clutch C₆ (34), and the brake B₁ (47), so that power enters the input shaft assembly (1) and is split into two parts; one part of the power is input from the input shaft (11) and then passes through the second clutch C₂ (23) to drive the variable displacement pump (21) to work; the variable displacement pump (21) outputs high-pressure oil to drive the fixed displacement motor (22) to rotate; the power output from the output shaft of the fixed displacement motor (22) sequentially passes through the first transmission gear (41), the second transmission gear (42), the fourth clutch C₄ (46), the third transmission gear (43), the fourth transmission gear (44), and the sun gear (33) to the planet carrier (32); the other part of the power sequentially passes through the first clutch C₁ (12), the linked intermediate gear set (13), the fifth clutch C₅ (14), and the outer ring gear (31) and is converged with the power passing through the hydraulic transmission assembly (2) and the intermediate gear transmission assembly (4) at the planet carrier (32); the power after convergence passes through the planet carrier (32) and the intermediate gear (52) and is output from the output shaft (51).

5. The control method of the hydro-mechanical series and parallel transmission device according to claim 4, characterized in that the rotation speed $n_o$ of the output shaft (51) in the hydro-mechanical series transmission mode and the hydro-mechanical parallel transmission mode is calculated by the following methods:

in the hydro-mechanical series transmission mode, $$n_o = \frac{e}{i_3 i_4 i_5 i_6} n_I$$

wherein $n_o$ is the rotation speed of the output shaft (51), $n_I$ is the rotation speed of the input shaft (11), $i_3$ is the transmission ratio of the first transmission gear (41) and the second transmission gear (42), $i_4$ is the transmission ratio of the third transmission gear (43) and the fourth transmission gear (44), $i_5$ is the transmission ratio of the outer ring gear (31) and the intermediate gear (52), and $i_6$ is the transmission ratio of the intermediate gear (52) and the output shaft (51);

in the hydro-mechanical parallel transmission mode, $$n_o = \frac{\frac{e}{i_3 i_4} + k \frac{1}{i_1 i_2}}{(k+1) i_5 i_6} n_1$$

wherein $n_o$ is the rotation speed of the output shaft (51), $n_I$ is the rotation speed of the input shaft (11), $i_1$ is the transmission ratio of the first clutch C₁ (12) and the linked intermediate gear set (13), $i_2$ is the transmission ratio of the linked intermediate gear set (13) and the fifth clutch C₅ (14), $i_3$ is the transmission ratio of the first transmission gear (41) and the second transmission gear (42), $i_4$ is the transmission ratio of the third transmission gear (43) and the fourth transmission gear (44), $i_5$ is the transmission ratio of the outer ring gear (31) and the intermediate gear (52), $i_6$ is the transmission ratio of the intermediate gear (52) and the output shaft (51), k is the characteristic parameter of the gear set in the planetary gear transmission assembly (3), and e is the displacement ratio of the hydraulic transmission assembly (2).

6. The control method of the hydro-mechanical series and parallel transmission device according to claim 2, characterized in that the hydraulic transmission mode is controlled by the following method:

engaging the second clutch C₂ (23), the third clutch C₃ (45), and the sixth clutch C₆ (34) while disengaging the first clutch C₁ (12), the fourth clutch C₄ (46), the fifth clutch C₅ (14), and the brake B₁ (47), so that power is input from the input shaft (11) and then passes through the second clutch C₂ (23) to drive the variable displacement pump (21) to work, the variable displacement pump (21) outputs high-pressure oil to drive the fixed displacement motor (22) to rotate, and the power output from the output shaft of the fixed displacement motor (22) sequentially passes through the third clutch C₃ (45), the sixth clutch C₆ (34), the sun gear (33), the planet carrier (32), and the intermediate gear (52) and is output from the output shaft (51).

7. The control method of the hydro-mechanical series and parallel transmission device according to claim 6, characterized in that a rotation speed ne of the output shaft (51) in the hydraulic transmission mode is calculated by the following method:

$$n_o = \frac{e}{i_5 i_6} n_I$$

wherein $n_o$ is the rotation speed of the output shaft (51), $n_I$ is a rotation speed of the input shaft (11), $i_5$ is a transmission ratio of the outer ring gear (31) and the intermediate gear (52), $i_6$ is a transmission ratio of the intermediate gear (52) and the output shaft (51), and e is a displacement ratio of the hydraulic transmission assembly (2).

8. The control method of the hydro-mechanical series and parallel transmission device according to claim 2, characterized in that the mechanical transmission mode comprises a first mechanical transmission gear, a second mechanical transmission gear, and a third mechanical transmission gear and is specifically controlled by the following methods:

in the first mechanical transmission gear, engaging the first clutch $C_1$ (12), the fifth clutch $C_5$ (14), and the brake $B_1$ (47) while disengaging the second clutch $C_2$ (23), the third clutch $C_3$ (45), the fourth clutch $C_4$ (46), and the sixth clutch $C_6$ (34), so that power is input from the input shaft (11), then sequentially passes through the first clutch $C_1$ (12), the linked intermediate gear set (13), the fifth clutch $C_5$ (14), the outer ring gear (31), the planet carrier (32), and the intermediate gear (52), and is output from the output shaft (51);

in the second mechanical transmission gear, engaging the first clutch $C_1$ (12), the fifth clutch $C_5$ (14), and the sixth clutch $C_6$ (34) while disengaging the second clutch $C_2$ (23), the third clutch $C_4$ (45), the fourth clutch $C_4$ (46), and the brake $B_1$ (47), so that power is input from the input shaft (11), then sequentially passes through the first clutch $C_1$ (12), the linked intermediate gear set (13), the fifth clutch $C_5$ (14), the sixth clutch $C_6$ (34), the sun gear (33), the planet carrier (32), and the intermediate gear (52), and is output from the output shaft (51);

in the third mechanical transmission gear, engaging the first clutch $C_1$ (12), the third clutch $C_3$ (45), the fourth clutch $C_4$ (46), and the fifth clutch $C_5$ (14) while disengaging the second clutch $C_2$ (23), the sixth clutch $C_6$ (34), and the brake $B_1$ (47), so that power is input from the input shaft (11), then sequentially passes through the first clutch $C_1$ (12) and the linked intermediate gear set (13) to the fifth clutch $C_5$ (14), and is split into two parts; one part of the power passes through the third clutch $C_5$ (45), the first transmission gear (41), the second transmission gear (42), the fourth clutch $C_4$ (46), the third transmission gear (43), the fourth transmission gear (44), and the sun gear (33) to the planet carrier (32); the other part of the power passes through the outer ring gear (31) and is converged with the power from the intermediate gear transmission assembly (4) at the planet carrier (32); the power after convergence passes through the planet carrier (32) and the intermediate gear (52) and is output from the output shaft (51).

9. The control method of the hydro-mechanical series and parallel transmission device according to claim 8, characterized in that the rotation speed $n_o$ of the output shaft (51) in the first mechanical transmission gear, the second mechanical transmission gear, and the third mechanical transmission gear is calculated by the following methods:

in the first mechanical transmission gear, $$n_o = \frac{k}{(k+1)i_1 i_2 i_5 i_6} n_I$$

wherein $n_o$ is the rotation speed of the output shaft (51), $n_I$ is the rotation speed of the input shaft (11), it is a transmission ratio of the first clutch $C_1$ (12) and the linked intermediate gear set (13), $i_2$ is a transmission ratio of the linked intermediate gear set (13) and the fifth clutch $C_5$ (14), $i_5$ is the transmission ratio of the outer ring gear (31) and the intermediate gear (52), $i_6$ is the transmission ratio of the intermediate gear (52) and the output shaft (51), and k is a characteristic parameter of the gear set in the planetary gear transmission assembly (3);

in the second mechanical transmission gear, $$n_o = \frac{1}{i_1 i_2 i_5 i_6} n_I$$

wherein $n_o$ is the rotation speed of the output shaft (51), $n_I$ is the rotation speed of the input shaft (11), it is the transmission ratio of the first clutch $C_1$ (12) and the linked intermediate gear set (13), $i_2$ is the transmission ratio of the linked intermediate gear set (13) and the fifth clutch $C_5$ (14), $i_5$ is the transmission ratio of the outer ring gear (31) and the intermediate gear (52), and $i_6$ is the transmission ratio of the intermediate gear (52) and the output shaft (51);

in the third mechanical transmission gear, $$n_o = \frac{\frac{1}{i_1 i_2 i_3 i_4} + k \frac{1}{i_1 i_2}}{(k+1) i_5 i_6} n_I$$

wherein $n_o$ is the rotation speed of the output shaft (51), $n_I$ is the rotation speed of the input shaft (11), $i_1$ is the transmission ratio of the first clutch $C_1$ (12) and the linked intermediate gear set (13), $i_2$ is the transmission ratio of the linked intermediate gear set (13) and the fifth clutch $C_5$ (14), $i_5$ is a transmission ratio of the first transmission gear (41) and the second transmission gear (42), $i_4$ is a transmission ratio of the third transmission gear (43) and the fourth transmission gear (44), $i_5$ is the transmission ratio of the outer ring gear (31) and the intermediate gear (52), $i_5$ is the transmission ratio of the intermediate gear (52) and the output shaft (51), and k is the characteristic parameter of the gear set in the planetary gear transmission assembly (3).

* * * * *